US008880988B2

(12) United States Patent
Barrett et al.

(10) Patent No.: US 8,880,988 B2
(45) Date of Patent: Nov. 4, 2014

(54) SYSTEM AND METHOD FOR DYNAMIC CREATION OF IMAGES

(75) Inventors: Kevin R. Barrett, Houston, TX (US); Andrew Barnett, Houston, TX (US)

(73) Assignee: CA, Inc., Islandia, NY (US)

(*) Notice: Subject to any disclaimer, the term of this patent is extended or adjusted under 35 U.S.C. 154(b) by 1476 days.

(21) Appl. No.: 10/888,629

(22) Filed: Jul. 8, 2004

(65) Prior Publication Data

US 2005/0151739 A1 Jul. 14, 2005

Related U.S. Application Data

(60) Provisional application No. 60/486,855, filed on Jul. 10, 2003.

(51) Int. Cl.
G06F 17/20 (2006.01)
G06Q 10/06 (2012.01)

(52) U.S. Cl.
CPC ........ *G06Q 10/06* (2013.01); *G06Q 10/063114* (2013.01)
USPC ........................................ 715/200

(58) Field of Classification Search
USPC ............ 715/530, 255, 273; 345/440.2; 705/7; 717/101
See application file for complete search history.

(56) References Cited

U.S. PATENT DOCUMENTS

| 5,455,898 | A | * | 10/1995 | Mahoney et al. | 715/527 |
|---|---|---|---|---|---|
| 6,452,597 | B1 | * | 9/2002 | Goldberg et al. | 345/472 |
| 6,456,305 | B1 | * | 9/2002 | Qureshi et al. | 715/800 |
| 6,734,864 | B2 | * | 5/2004 | Abgrall | 345/537 |
| 6,900,807 | B1 | * | 5/2005 | Liongosari et al. | 345/440 |
| 7,165,264 | B1 | * | 1/2007 | Westrick | 725/40 |
| 2002/0059243 | A1 | * | 5/2002 | Gillespie et al. | 707/10 |
| 2003/0106039 | A1 | * | 6/2003 | Rosnow et al. | 717/100 |
| 2003/0137541 | A1 | * | 7/2003 | Massengale et al. | 345/764 |
| 2005/0102324 | A1 | * | 5/2005 | Spring et al. | 707/104.1 |
| 2005/0264832 | A1 | * | 12/2005 | Baum et al. | 358/1.2 |
| 2006/0192791 | A1 | * | 8/2006 | Schick et al. | 345/661 |
| 2007/0237409 | A1 | * | 10/2007 | Atsumi et al. | 382/239 |

OTHER PUBLICATIONS

Berghel, Hal., "The Client's Side of the World Wide Web", Jan. 1996, vol. 39, No. 1, Communications of the ACM.*
PCT International Search Report (PCT/US2004/22029) mailed Oct. 20, 2006 (9 pages), Oct. 20, 2006.

* cited by examiner

*Primary Examiner* — Frank D Mills
(74) *Attorney, Agent, or Firm* — Baker Botts, LLP

(57) ABSTRACT

A method for dynamically publishing an image including providing at least one parameter, generating the image using the at least one, parameter, verifying that the generated image is of an appropriate size, formatting the generated image of an appropriate size to comply with a standard image file format, and making the formatted image available over a network.

56 Claims, 12 Drawing Sheets

SYSTEM AND METHOD FOR DYNAMIC CREATION OF IMAGES

REFERENCE TO RELATED APPLICATIONS

The present disclosure is based on and claims the benefit of Provisional Application 60/486,855 filed Jul. 10, 2003, the entire contents of which are herein incorporated by reference.

BACKGROUND

1. Technical Field

The present disclosure relates to images, and more specifically to systems and methods for dynamic creation of images.

2. Description of the Related Art

Project management is the process of planning, organizing, staffing, directing and controlling the development of a product, the production of a system or any other goal-oriented endeavor. By employing principals of project management, businesses can make project handling more efficient and increase transparency so that a business can more easily gauge the status of projects and have attention drawn to potential trouble areas that can threaten the timely success of the endeavor.

Charts have traditionally played and continue to play an important role in project management. One example of a chart used in project management is a Gantt chart. A Gantt chart is often a horizontal bar chart developed as a production tool in 1917 by Henry L. Gantt. Gantt charts are often used in project management to provide a graphical illustration of a schedule that helps to plan, coordinate and track specific components and milestones of a project.

In recent years, businesses have begun to use computer systems to aid in project management. Computers have the ability simplify the creation and editing of charts such as Gantt charts and tie the creation of such charts to pertinent information stored by a business.

To enhance the effectiveness of computer systems performing business applications such as project management, users should be able to easily access computer resources. The emergence of the internet represents a new way for users to access remote computer resources. Through the use of web pages, a computer hosting computer resources can make these resources available to users across various platforms and throughout the world.

Web pages are created and published by web page designers for subsequent viewing by users wishing to access the published web pages using their web browsers. Under this approach, users could browse, or surf, through sequences of prepared web pages until the user located the data the user was searching for. Under this approach, data could be displayed using illustrative graphics, such as jpegs. However, these graphics have been already generated and published to the web-server before the user could view them using the web browser.

Today, there is a need for more interactive web sites. For example, businesses may wish to make computer services such as project management applications available to a broad class of users as a web-based application (web applications). Not surprisingly, web applications have been growing in popularity. Web applications are much more than prepared web sites, web applications allow users to interact with and exploit the functionality of computer resources remotely over computer networks such as the Internet. For example, applications that were traditionally installed and executed from a local computer, for example project management systems are commonly being installed and executed on remote servers. Users then interact with the remote applications through the web browser.

By transforming applications, such as project management systems, to web applications, users should be able to view the text and graphics generated by the applications, such as, for example, Gantt charts, as they are created. This is a departure from conventional web sites that consisted mainly of pre-prepared web sites. Web applications should be able to generate and publish new web pages "on the fly" to meet the demands of modern interactive web pages and web-based applications.

SUMMARY

A method for dynamically publishing an image including providing at least one parameter, generating the image using the at least one parameter, verifying that the generated image is of an appropriate size, formatting the generated image of an appropriate size to comply with a standard image file format, and making the formatted image available over a network.

A system for dynamically publishing an image including a providing unit for providing at least one parameter, a generating unit for generating the image using the at least one parameter, a verifying unit for verifying that the generated image is of an appropriate size, a formatting unit for formatting the generated image of an appropriate size to comply with a standard image file format, and a making unit for making the formatted image available over a network.

A computer system including a processor and a program storage device readable by the computer system, embodying a program of instructions executable by the processor to perform method steps for dynamically publishing an image, the method including providing at least one parameter, generating the image using the at least one parameter, verifying that the generated image is of an appropriate size, formatting the generated image of an appropriate size to comply with a standard image file format, and making the formatted image available over a network.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
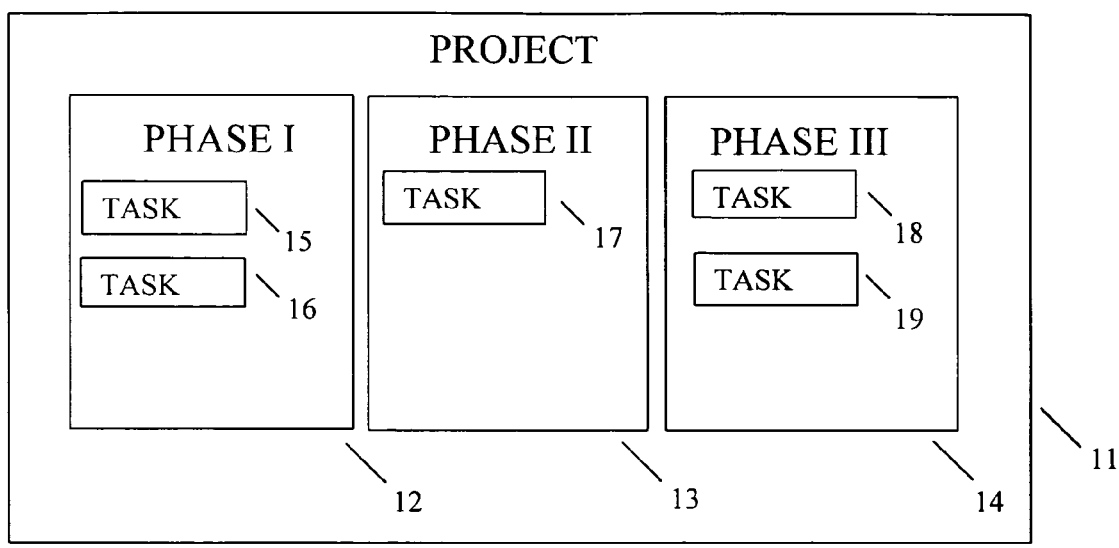
FIG. 1 shows the composition of an exemplary project according to embodiments of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Project management systems, according to embodiments of the present disclosure, can be used to organize, manage and track the progress of projects. A project is generally a goal-oriented endeavor. For example, a project may be the development of a new product for manufacture and sale. These project management systems may be capable of managing multiple projects.

FIG. 1 illustrates the composition of an exemplary project for describing embodiments of the present disclosure. A project 11 may be broken down into several project phases 12-14. A project phase 12-14 is generally a distinct stage in the project's 11 development. For example, the project 11 of developing a new product for manufacture and sale may have a planning phase (phase I) 12, an implementation phase (phase II) 13 and a rollout phase (phase III) 14.

Each project phase 12-14 may be made up of multiple tasks 15-19. A task is generally a specific function to be performed. For example, the planning phase 12 may have tasks such as to create a Product Requirements Specification (PRS) 15 and to obtain PRS approval 16.

Project management systems according to embodiments of the present disclosure may also be capable of handling multiple resources. A resource is generally someone or something that can be used to advance the development of the project. For example, an employee of the business may be considered a project resource. For example, a machine may be considered a project resource.

Project management systems according to embodiments of the present disclosure may also be capable of handling multiple users. Users may be people who may interact with the project management systems to organize and/or track the status of a project. Some examples of users include administration managers, resource managers, project managers, executives, etc.

Figure 2:
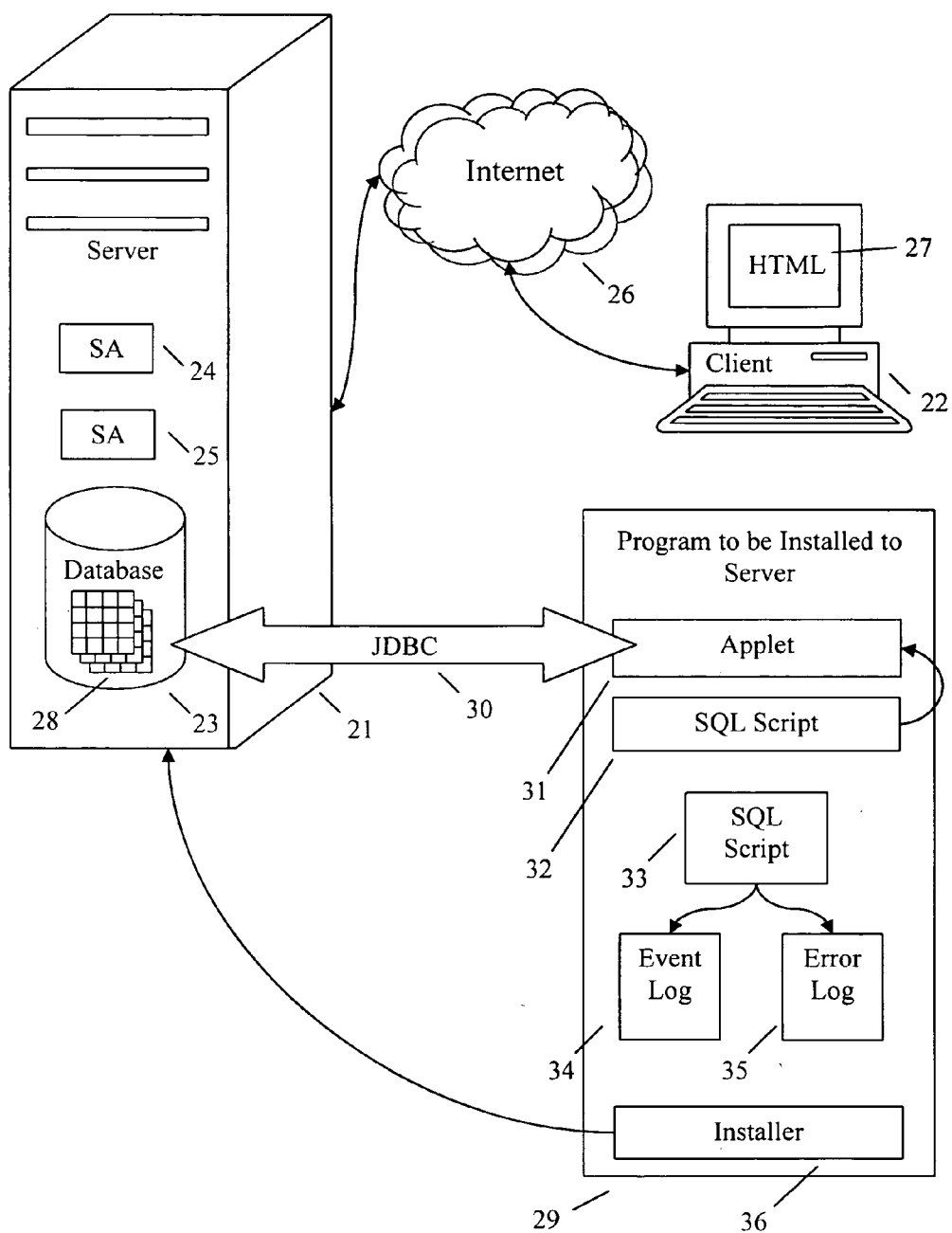
FIG. 2 shows a client-server configuration according to an embodiment of the present disclosure.

FIG. 2 illustrates a project management system according to an embodiment of the present disclosure. One of the functions of the project management systems according to embodiments of the present disclosure is to store and organize information pertaining to projects, project phases, tasks, resources and users. This pertinent information can be stored, for example, in a database 23, for example, running on a server 21. This server 21 may be, for example, a server running Microsoft Windows 2003 Server and may additionally be running Microsoft SQL server 2000. The server 21 may also be a combination of more than one server, for example a web content server combined with a database server. A client 22 may then be able to establish a connection with the server 21 so that pertinent information can be accessed by users through the client 22. This client 22 may be, for example, a workstation running Microsoft Windows XP.

The client 22 may be connected to the server 21 over a computer network. The computer network may be a local area network (LAN) or a wide area network (WAN). For example, the network may be the Internet. The server 21 may communicate with the client 22, for example, by publishing web pages that are made accessible to the client 22, through the publication of web pages. Web pages may be, for example, web pages 27 and/or Java based applications, for example JavaScript's. The client 22 may view the published web pages using a web browser.

The server 21 may also contain one or more server applications 24-25. Each server application 24-25 may be capable of accessing, displaying, manipulating and/or utilizing pertinent data stored in the database 23. Server applications 24-25 may also present text and graphical information back to the users. Users may access one or more server applications 24-25 through the client 22. To more easily communicate with clients operating on various platforms, server applications may present data back to the users by organizing information in a platform-independent format, for example HTML. In such an example, the server applications 24-25 interact with the user by generating web pages 27 that can be viewed by a browser installed on the client 22 as described in greater detail below.

In adapting computer systems for project management according to embodiments of the present disclosure, the database of pertinent information 23 may be a relational database. A relational database is an application for the storing and retrieval of data wherein one or more database tables 28 may be provided. These database tables 28 can be made up of a collection of records, each record having one or more fields. Tables 28 within the database 23 may then be related to one another by the occurrence of one or more common fields.

The storing and retrieval of data (data management) within relational databases is commonly carried out by a database management program. A server application 24-25 may be responsible for the management of the database 23. Applications for the management of databases (database management programs) commonly accept commands from users and/or other programs and subsequently perform these commands on the database 23. Users and/or other programs, for example, other server applications, may communicate with the database management program in a language such as SQL. SQL is an industry-standard language for communicating with relational database management systems.

A project management system according to an embodiment of the present disclosure may interact with the database management program to store and/or retrieve information from the database 23. Before the project management system according to the present disclosure may be properly executed on the server 21, the project management system should be properly installed on the server 21. Installation is the process by which the files associated with a computer program to be installed 29 (the project management system) may be copied onto the target computer, for example the server 21, and the target computer is otherwise prepared for the execution of the computer program to be installed 29. To automate this installation process, an installer 36 may be used. An installer 36 according to an embodiment of the present disclosure may be used to install a program 29, for example a project management system, onto a computer, for example the server 21, with minimal user interaction.

The project management system according to an embodiment of the present disclosure may interact with the database management program to store and/or retrieve information from the database 23. Before the project management system, or another computer program that interacts with a database management program, may be installed, the database may first need to be properly configured. Proper configuration of a database 23 may require the setting up of database schema on the database 23. A database schema may be a structure of database tables 28 that store information within a relational database. In order to setup the database schema, it may be necessary for database commands to be issued to the database management program.

Installer 36 may not be capable of issuing commands to the database 23 to setup database schema. Therefore, after the installer 35 has successfully installed the program to be installed 29, an application 31, for example a Java applet, may be executed by the program to be installed 29. For example, the application 31 may be executed the first time the program to be installed 29 is executed. Alternatively, the application 31 may be executed after the installer 35 has terminated.

The application 31 may be contained within a Java class file located within the files of the program to be installed 29. When the application 31 is executed, a script file 32, for example a SQL script file of SQL instructions, located within the files of the program to be installed 29 may be dynamically executed. Here dynamic execution refers to the application's 31 ability to execute commands within the script file 33 as they are read without having to first compile the script file 32. By allowing for dynamic execution, script files may be changed and/or updated at any time without adversely affecting the operation of the application 31.

The SQL script file 32 may be a sequence of SQL commands designed to configure the database schema. The application 31 may communicate with the database 23 through a database connection, for example, a Java Database Connectivity (JDBC) connection 30. A JDBC is an application programming interface that allows Java programs to execute SQL commands on a database.

According to another embodiment of the present disclosure, a programming language other than Java, for example C++, may be used to generate the application 31. An application 31 written in a language other than Java may still be able to communicate with the database 23 through an open database connectivity 30 other than JDBC.

According to another embodiment of the present disclosure, the DBM may accept commands in a language other than SQL. The script file 32, for this embodiment, may be a script file written in the same language that is accepted by the DBM in use.

Any failures that occur during the configuration of the database schema may be detected by the application 31 and appropriate remedial steps may be taken. For example, the user may be alerted as to the nature and/or probable cause of the failure and the steps that can be taken to correct the failure. Alternatively, remedial steps can be taken automatically by the application 31 to produce the desired result.

When the SQL script file 32 is run, an event log 34 and/or an error log 35 may be created to store information pertaining to occurrences and errors appearing during the running of the SQL script file 32. These event logs can be accessed by the application 31 or the user to diagnose and remedy any problems that may occur.

Figure 3:
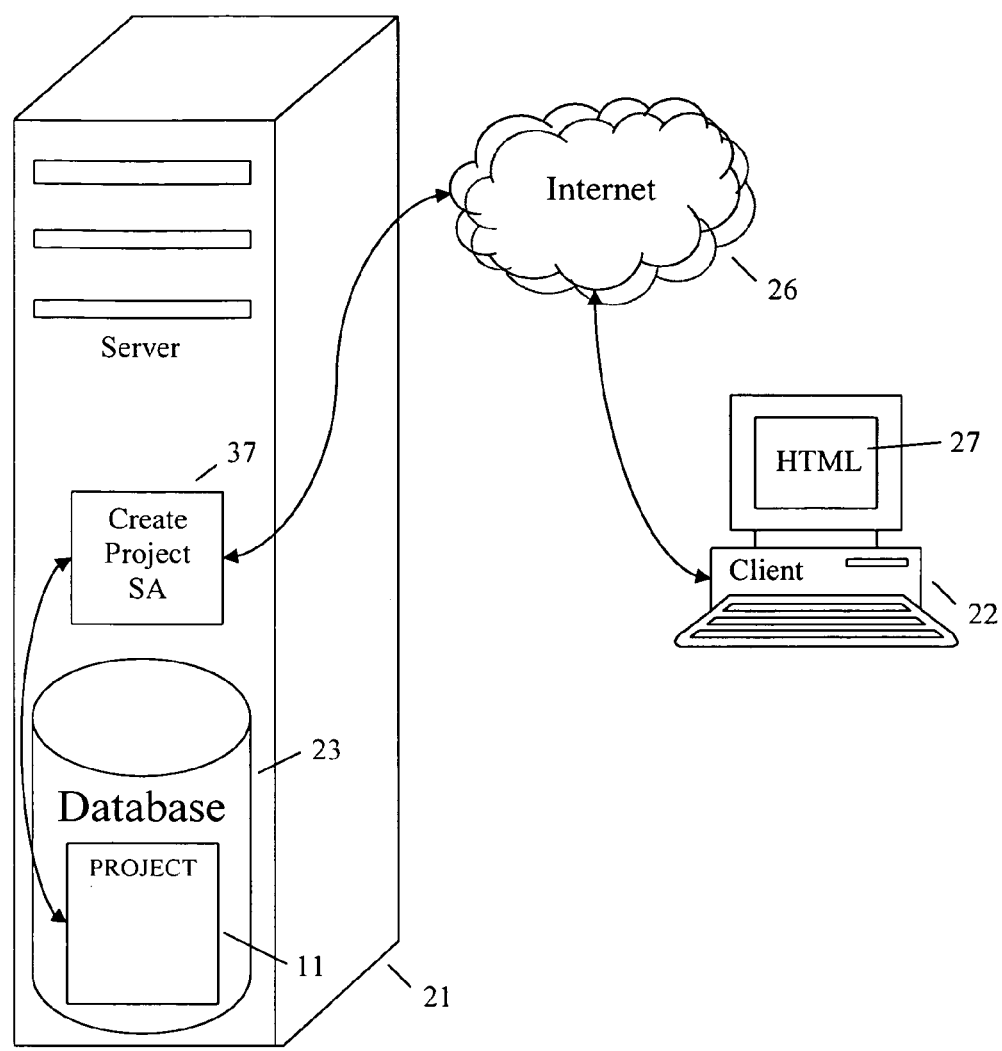
FIG. 3 shows an example of how projects are created and stored according to embodiments of the present disclosure.

According to embodiments of the present disclosure, information pertaining to projects 11 may be stored in the database 23. FIG. 3 illustrates an example of how projects 11 may be created and stored according to embodiments of the present disclosure. A Create Project server application 37 may be used to store information pertaining to a project 11 in the database 23 with each project being stored as a database record entry with pertinent information being stored within fields of that entry. For example, project fields may include project name, project code, project description, manager, project state, project type, account code, client code, revision, project status, locked, locked by, start date and/or end date. The project name can be any name that helps identify the project, for example a project name may be the name of a new product under development. The project name may be used when pertinent information relating to a project is displayed to users. The project code may be a number or alphanumeric field that uniquely identifies the project. The project code may be used by embodiments of the present disclosure to facilitate analysis of a given project by referring to the project using a unique identifier. The project type may be a category of project that the project conforms to. The project description may be a brief explanation of the purpose of the project. The account code and client code may be used to account for the project's expenses. The project revision may be used to keep track of how many times the project has been revised and to make sure that the project information is current. A project may be locked to ensure that the project is not modified or deleted. The locked entry may store information pertaining to whether the project has been locked, and the locked by field may store information pertaining to who locked the project. The manager entry may be used to indicate who is primarily responsible for the management of the project. The person with manager responsibility may be the person responsible for defining and updating information pertinent to that specific project. The start date field may be used to record the date when the project is scheduled to begin and the end date field may be used to record the date when the project is scheduled to end. It may not be essential that all fields be initially filled when the project entry is created. However, certain fields may be designated as required fields for which information must be provided when the project entry is created. Other fields may be optional fields for which information need not be provided when the project entry is created. For example, project name, project code, project description and project manager may be required fields. Server applications may also exist for the viewing, editing, deletion, searching, locking and unlocking of project records.

As stated above, a project phase is generally a distinct stage in the project's development. Users may access server applications for the creation and management of records relating to project phases. These records may have multiple fields. Examples of project phase record fields include baseline start, baseline finish, scheduled start, scheduled finish, actual start, actual finish and percent complete.

Baseline start and baseline finish fields represent the original planned start and planned finish dates. Scheduled start and scheduled finish dates represent the current planed start and planned finish date. While scheduled dates may change as the project progresses, baseline dates may be used to gauge how a project phase is progressing relative to its original baseline plan. Actual start and actual finish dates represent the dates that the phase actually began and actually completed. Percent complete represents how much of the phase has actually been completed.

As stated above, a task is generally a specific function to be performed in the furtherance of the project. A task generally is, but need not be, associated with a phase. A task may be associated directly to a project. For example, a project may not be made up of phases but may be made up directly of tasks. Alternatively, a project may be made up of phases and tasks and the phases may also be made up of tasks. According to a common example, a project is made up of phases and those phases may be made up of tasks.

Users may access server applications for the creation and management of records relating to project tasks. These records may have multiple fields. Examples of project task record fields include scheduled effort, actual effort, remaining effort, baseline effort, scheduled start and finish, actual start and finish, and/or baseline start and finish. Progress made in the furtherance of a task can be deemed an effort. Task progress may be viewed in terms of when the effort is to occur (scheduled effort), when the effort actually occurs (actual effort), how much of the effort remains (remaining effort), and the original scheduled start of the effort (baseline effort). Task progress may be viewed in terms of effort when the task is not likely to take too long to complete or in other situations when it may not make sense to talk about the task in terms of a start data and a finish date. For example, a task involving obtaining approval or informing an executive may best be viewed in terms of an effort. Where appropriate, a tasks progress may be viewed in terms of scheduled start and finish, actual start and finish and/or baseline start and finish. It may also be desirable to use various combinations of the above fields. For example, it may sometimes be appropriate to mix effort fields with start and finish fields.

According to embodiments of the present disclosure, one or more phase fields may be pegged to one or more task fields. For example, the percent completed of a phase may be calculated from the number of tasks completed within the phase and/or the percent completion of the tasks. Likewise, one or more project fields may be pegged to one or more phase fields and/or task fields. For example, the project start date may be the earliest start date of a phase within the project. More generally, one or more fields of a project, phase, or task (a project item) may be pegged to another project item. For example, the start date of one phase may be pegged to the end date of another phase.

Figure 4:
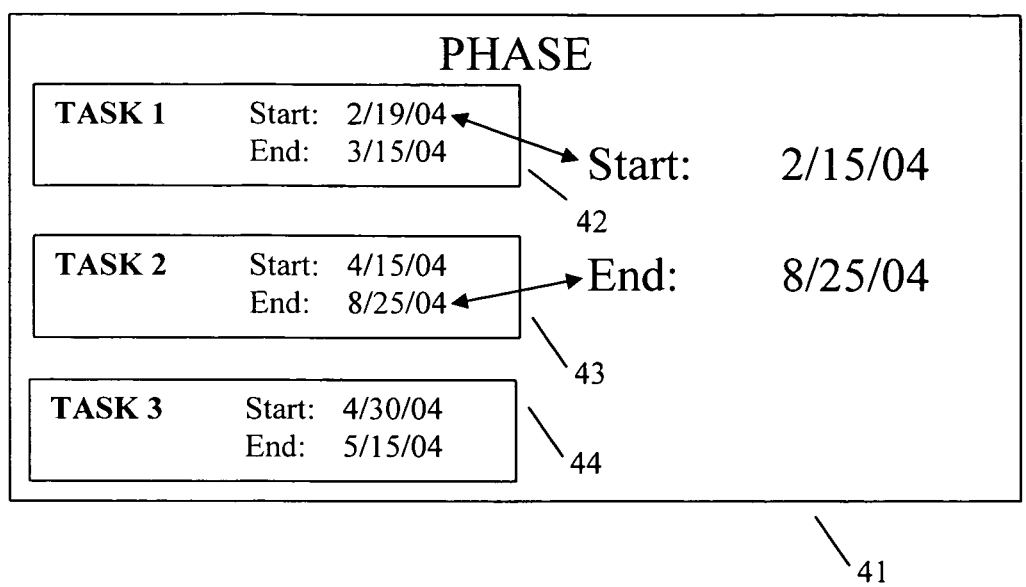
FIG. 4 shows the composition of an exemplary project phase according to embodiments of the present disclosure and illustrates an example of how a phase field can be pegged to a task field.

FIG. 4 illustrates the composition of an exemplary project phase according to embodiments of the present disclosure and illustrates an example of how a phase field can be pegged to a task field. Here, a phase 41 is comprised of three tasks 42-44. The start and end times of the phase 41 may be pegged to the start and end times of the tasks 42-44 such that the start time of the phase 41 is the start time of the task with the earliest start time, here task 1 42. The end time if the phase 41 is the end time of the task with the latest end time, here task 2 43.

Tasks may be assigned to a resource. Resources are at the heart of project management. As stated above, resources may be the people and equipment whose efforts and/or services perform the tasks that further the project. Resources may have limited availability that may contribute to the time allotted for the completion of various tasks. For example, a resource may have an availability date and a termination date. Information pertaining to resources should be entered into the database 23. According to embodiments of the present disclosure, information pertaining to a resource can be entered into the database by using a client 22 to access Create Resource server application. The Create Resource server application creates a database entry in the database 23 for a particular resource. When accessed, information such as, for example, the resource name, resource login ID, resource manager, resource availability date, resource termination date, and whether to add the resource to the manager list (e.g. is the resource a manager) can be provided to the Create Resource server application for entry into the database 11. It may not be essential that all fields be filled in when the resource entry is created. Therefore, certain fields may be required fields for which information should be provided when the resource entry is created while other fields may be optional fields for which information need not be provided when the resource entry is created. For example, resource name, resource login ID and resource availability date may be required fields. Server applications may also exist for the viewing, editing, deletion and searching of resource entries.

Resources may also be team members. A team member can be a person whose efforts may be directed in the furtherance of a project. A team member may be assigned one or more tasks. According to embodiments of the present disclosure, team member to do lists may be stored on the database 23. A team member to do list may contain a listing of not-yet completed tasks that have been assigned to the team member. A user may access a server application to view a team member's to do list. This server application can display the list of tasks according to one or more filters to more clearly present the tasks, especially when a team member's to do list includes a large number of tasks. For example, a filter may be used to only show those tasks that may be past due. For example, tasks may appear color coded. For example, red may indicate that a task is behind schedule, yellow may indicate that a task is in danger of falling behind schedule, and green may represent that a task is on time or ahead of schedule. These characterizations may be based on the various entry fields relating to the task and may be computed by an analysis server application as discussed in detail below.

Like tasks, phases and projects may be assigned to individuals. These individuals may also have to do lists that may include tasks, phases and/or projects for which that individual has responsibility for.

Figure 5:
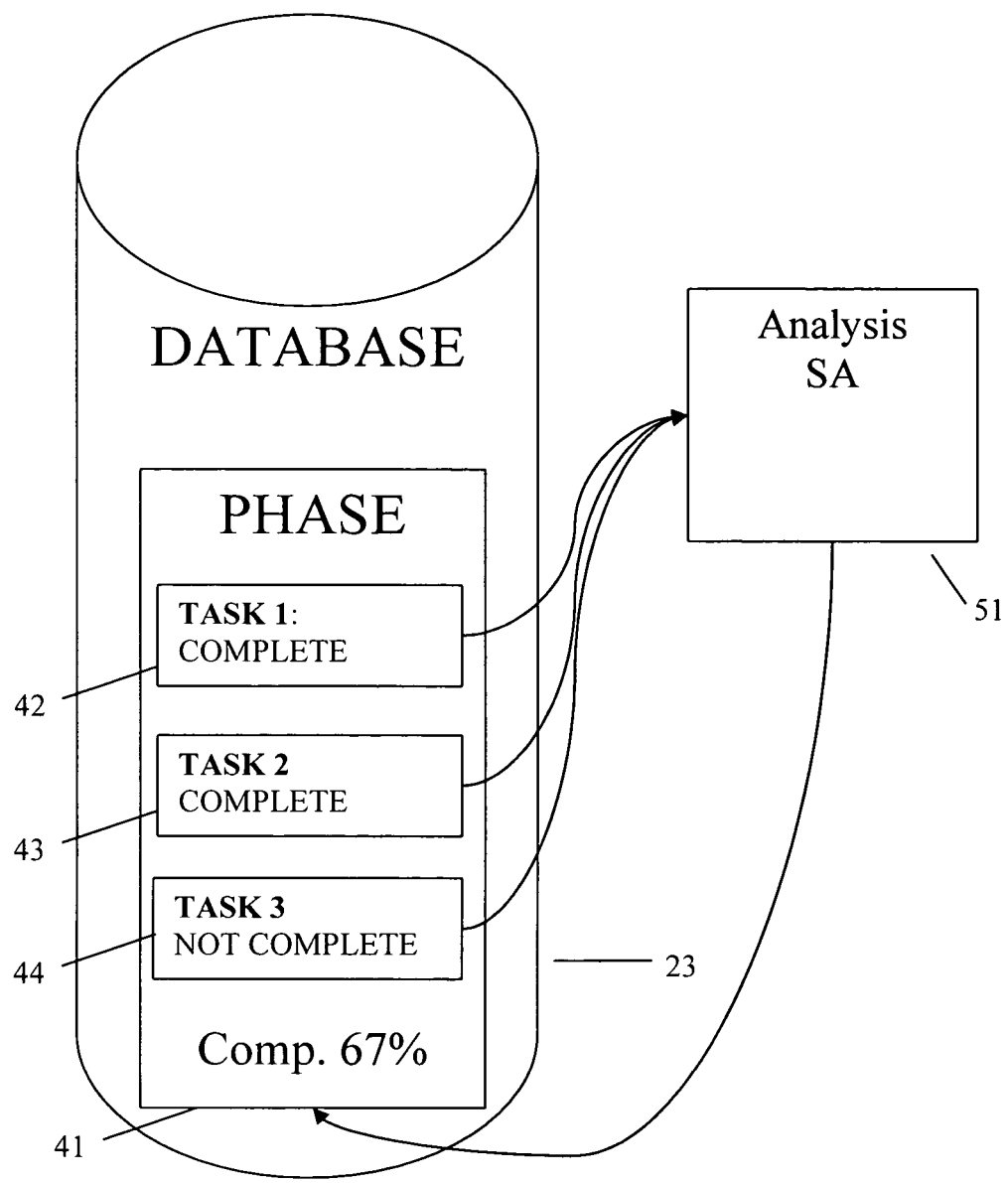
FIG. 5 shows an example of how an analysis function may be used to calculate the percent completion of a phase according to embodiments of the present disclosure.

One or more server applications 24-25 may be made available for the analysis of information stored in the database 23. Analytical functions may be performed by server applications to assess the status of tasks, phases and projects. These analytical functions may call upon data fields to gather the information to analyze. For example, an analytical function may calculate the percent completion of a phase by analyzing the number of tasks within that phase that have been completed successfully and the number of tasks that remain to be completed. FIG. 5 illustrates an example of how an analysis function may be used to calculate the percent completion of a phase. Here, for example, if a phase 41 has 3 tasks 42-44 and 2 of the tasks 42-43 have been completed successfully, that phase 41 may be 67% complete. An analysis server application 51 calls from the database 23 the record of the phase 41 and identifies the tasks 42-44 that may be associated with the phase 41. The records relating to each associated task 42-44 may be called from the database 23 and it can be determined whether the tasks 42-44 may be completed by examining the relevant fields, such as, for example, the actual completion date. The analysis server application 51 may then calculate the percent completion of the phase 41 by determining how many of the associated tasks 42-44 have been completed. This percent completion can then be stored as a field in the phase record and/or can be displayed to a user through a client 22.

Other analytical functions may be used to assess the status of a task, phase or project. The status may, for example, be normal, warning, critical or unknown. Normal refers to a task, phase or project that is on or ahead of schedule. Warning refers to a task, phase or project that has or is in danger of falling behind schedule and may therefore require further monitoring. Critical refers to a task, phase or project that has fallen far enough behind to be considered to require immediate attention. Unknown refers to a task, phase or project where not enough information is known to ascertain whether the task, phase or project is behind schedule.

Calculating status may also involve the use of tolerance ranges. Tolerance ranges can be numbers that may be defined specifically for each user (customizable) and may be used to define how far behind a task, phase or project must fall before it may be considered in a warning status or a critical status. A status may be calculated in multiple ways depending on the information that is available.

For example, if an actual start and a baseline start are known, and the project item in question is not yet complete, warning status may be achieved when actual start−baseline start>warning tolerance, for a given unit of time, for example, days. For example, a project may achieve warning status where the actual start occurred on day 6, the baseline start was day 1 and the warning tolerance is 3 days. However, the project will not achieve warning status where it additionally qualifies for critical status as described below. Here normal status may be achieved when actual start−baseline start is not greater than warning tolerance.

For example, if scheduled finish and baseline finish are known, and the project item in question is not yet complete, warning status may be achieved when scheduled finish−baseline finish>warning tolerance. However, the project will not achieve warning status where it additionally qualifies for critical status as described below. Here normal status may be achieved when scheduled finish−baseline finish is not greater than warning tolerance.

For example, if an actual start and a baseline start are known, and the project item in question is not yet complete, critical status may be achieved when actual start−baseline start>critical tolerance.

For example, if scheduled finish and baseline finish are known, and the project item in question is not yet complete, critical status may be achieved when scheduled finish−baseline finish>critical tolerance.

For example, where one of the actual start and the baseline start are not known and one of the scheduled finish and baseline finish are not known, and the project item in question is not yet complete, unknown status may be achieved.

Figure 6:
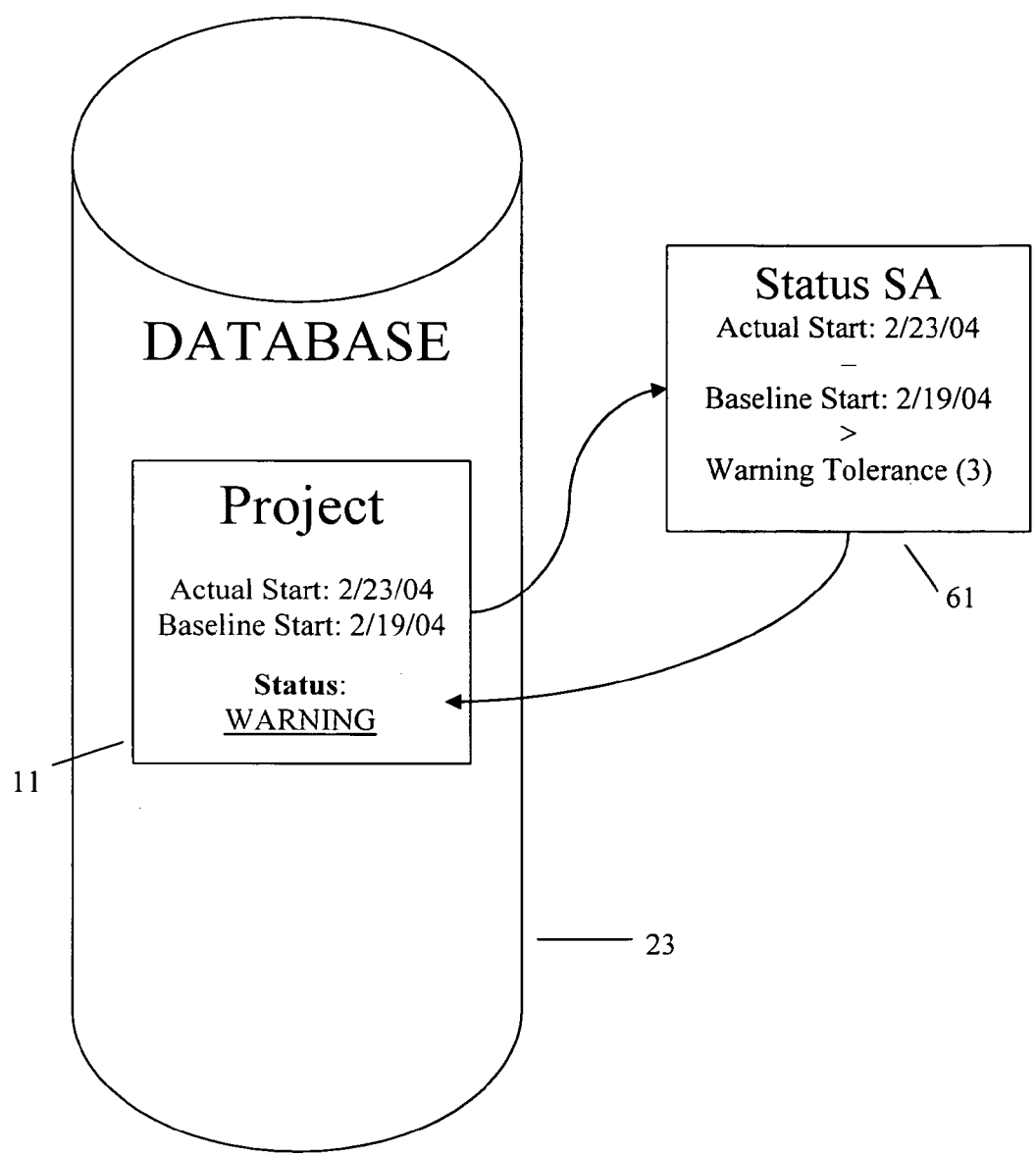
FIG. 6 shows an example of how status may be calculated according to embodiments of the present disclosure.

FIG. 6 illustrates an example of how status may be calculated according to embodiments of the present disclosure. Here a status server application 61 reads the record of a project 11 from the database 23. The actual start and baseline start fields may be read. Here the actual start is Feb. 23, 2004 and the baseline start is Feb. 19, 2004. The warning tolerance in this example is 3 days. Actual start (Feb. 23, 2004)−baseline start (Feb. 19, 2004)=4 days. Because 4 days is greater than the warning tolerance (3 days), the project 11 may be given warning status by the status server application 61. This status may be stored as a field in the project 11 record and/or displayed to a user through a client 22.

If not enough information is accessible to calculate status, status may be set to status unknown.

To enhance the accuracy of these calculations, server applications may be used to define and maintain a project calendar. A project calendar defines what days may be working days and what days may be non-working days. By maintaining a project calendar, status can be calculated with respect to how many working days behind a project item may be instead of how many actual days behind that project item is.

Figure 7:
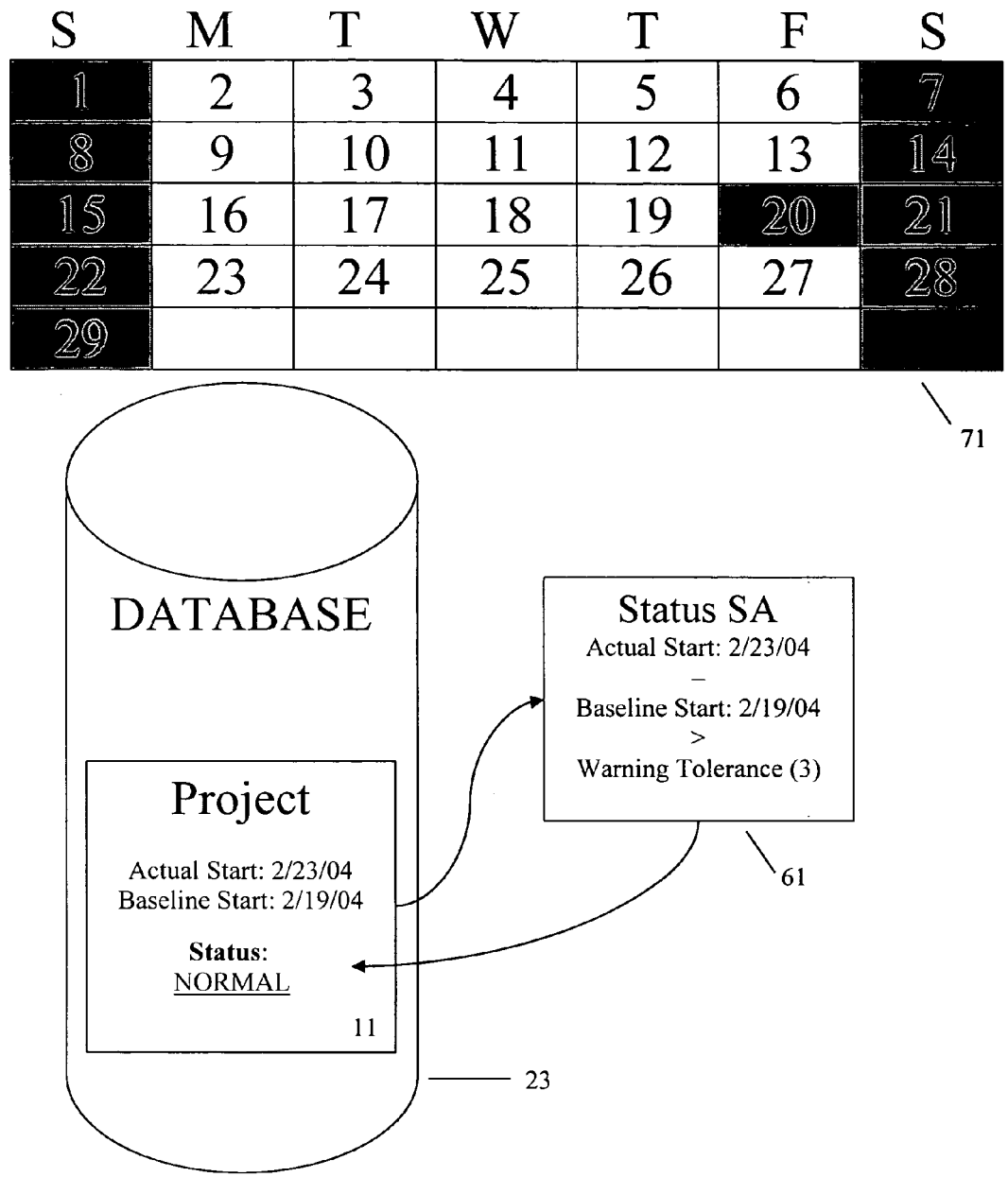
FIG. 7 shows an example of how status may be calculated according to embodiments of the present disclosure utilizing a project calendar.

FIG. 7 illustrates an example of how status may be calculated according to embodiments of the present disclosure utilizing a project calendar. Here the status server application 61 reads the record of a project 11 from the database 23. The actual start and baseline start fields are read. Here the actual start is Feb. 23, 2004 and the baseline start is Feb. 19, 2004. The warning tolerance in this example is 3 days. Although without the use of the project calendar 71, actual start (Feb. 23, 2004)−baseline start (Feb. 19, 2004)=4 days, the project calendar 71 identifies Feb. 20, 2004 as a holiday and Feb. 21, 2004-Feb. 22, 2004 as a weekend. Therefore actual start (Feb. 23, 2004)−baseline start (Feb. 19, 2004)=1 day. Because 1 day is not greater than the warning tolerance (3 days), the project 11 may be given normal status by the status server application 61. This status may be stored as a field in the project 11 record and/or displayed to a user through a client 22.

One or more server applications may be made available for the presentation and display of data and analysis. By effectively presenting this information, users such as, for example, administration managers, resource managers, project managers and executives can accurately gauge the progress of tasks, phases and projects. One example of an effective presentation of data and analysis that can be provided according to embodiments of the present disclosure is the Gantt chart.

Figure 8A:
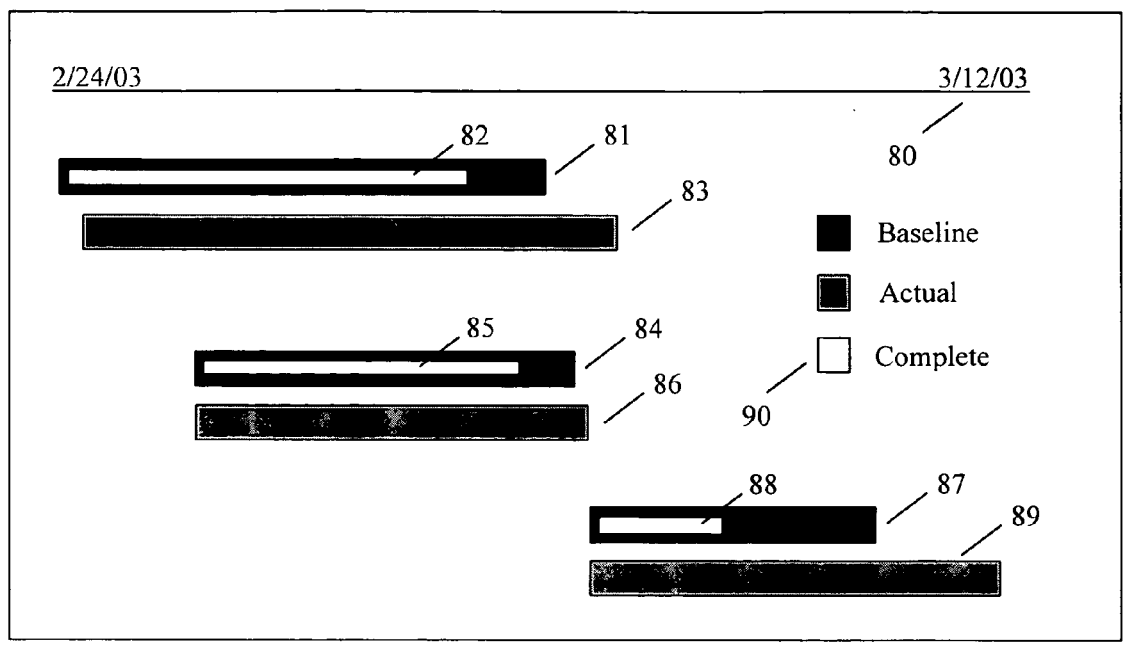
FIG. 8A shows a Gantt chart according to embodiments of the present disclosure.

As described above, the Gantt chart may be a horizontal bar chart often used to provide a graphical illustration of a schedule that helps to plan, coordinate and track specific components and milestones of a project. Gantt charts according to embodiments of the present disclosure may be used to represent the progress of projects, phases and/or tasks. FIG. 8A illustrates a Gantt chart according to embodiments of the present disclosure. A Gantt chart, according to embodiments of the present disclosure, may be made of one or more horizontal bars where the placement of the beginning of the bar along a horizontal axis 80 represents the beginning of the project items being displayed and the placement of the end of the bar along the horizontal axis 80 represents the end of the project items being displayed such that the length of the bar corresponds to the length of time the project item is active for and the placement of the bar represents when the project item is to be active. The horizontal axis 80 may be labeled with one or more dates to provide a clearer picture of the project timing. For a given project item being displayed, multiple bars may be displayed. For example, a baseline bar 81, 84, 87 may represent the baseline timeframe, beginning at the baseline start and ending at the baseline end. An actual bar 83, 86, 89 may represent the actual timeframe, beginning at the actual start and ending at the actual end. A complete bar 82, 85, 88 may represent the percent completion of the project item by making the complete bar 82, 85, 88 the length of the corresponding baseline bar 81, 84, 87 multiplied by the percent completion. For example, at 50% completion, the complete bar 82, 85, 88 may be half the length of the baseline bar 81, 84, 87 and at 100% completion, the complete bar 82, 85, 88 may be as long as the baseline bar 81, 84, 87. The complete bar 82, 85, 88, for example, may be represented as a thin bar drawn on top of the baseline bar 81, 84, 89. Alternatively, the complete bar 82, 85, 88, for example, may be represented as a thin bar drawn on top of the actual bar 83, 86, 89, in which case, the complete bar 82, 85, 88 may represent the percent completion of the project item by making the complete bar 82, 85, 88 the length of the corresponding actual bar 83, 86, 89 multiplied by the percent completion.

The Gantt chard according to embodiments of the present disclosure may be comprised of a set of bars for each project item being shown. A set of bars may include a baseline bar, an actual bar and a complete bar as described above. For example, where the Gantt chart shows a project, there may be a set of bars for each phase of the project. According to the example illustrated in FIG. 8A, phase I baseline bar 81 starts at the baseline start date of phase I and extends to the baseline end date of phase I. The phase I completion bar 82 may be drawn as a bar on top of, or within, the phase I baseline bar 81. Here the fact that the phase I completion bar 82 occupies the majority of the phase I baseline bar 81 indicates that the majority of the phase has been completed. The phase I actual bar 83 may be drawn alongside the phase I baseline bar 81 to facilitate comparison. In this example, the fact that the actual bar 83 begins later than, and ends later than the baseline bar 81 indicates that phase I actually began latter than and ended latter than the baseline projection. Phase II and phase III are similarly represented in this example.

Gantt charts according to embodiments of the present disclosure may be drillable. Drillable Gantt charts allow for a user to select a horizontal bar of interest and produce another Gantt chart devoted to the composition of the selected horizontal bar from the first Gantt chart. The selecting of a horizontal bar in this fashion may be known as drilling down. For example, a Gantt chart illustrating phases of a project may have a bar representing a particular phase selected so that a Gantt chart illustrating component tasks of that phase may be displayed.

Drillable Gantt charts according to embodiments of the present disclosure may also be able to provide additional information about a particular element of the Gantt chart without the user necessarily drilling down. For example, a user may hover a mouse-controlled cursor over a Gantt bar of interest and in so doing may trigger a popup text box providing additional information about the hovered item.

Figure 9:
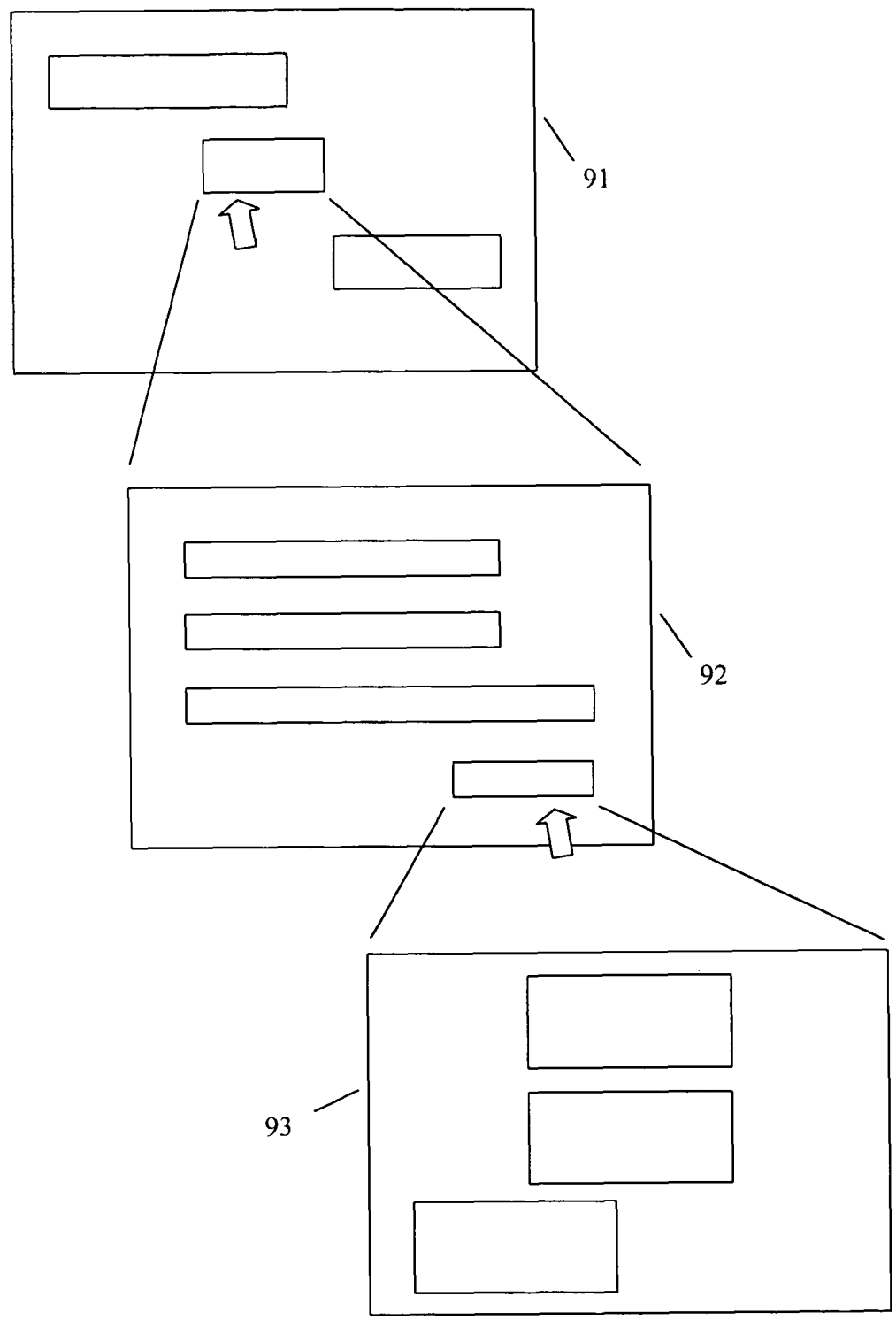
FIG. 9 shows drillable Gantt charts according to embodiments of the present disclosure.

FIG. 9 illustrates drillable Gantt charts according to embodiments of the present disclosure. There may be multiple ways in which drilling-down can occur. For example, a Gantt illustrating projects 91 may be drilled-down to display a Gantt illustrating phases of the project selected 92. For example, a Gantt illustrating phases 92 may be drilled-down to display a Gantt illustrating tasks of the phase selected 93. And, for example, a Gantt illustrating tasks may be drilled-down to display a Gantt illustrating the resources assigned to the task selected.

Horizontal bars within Gantt charts, according to embodiments of the present disclosure, may be color coded to represent the status of the project item the bars represent. For example, red may indicate that a project item has a critical status, yellow may indicate that the project item has a warning status, and green may indicate that the project item has a normal status.

Figure 8B:
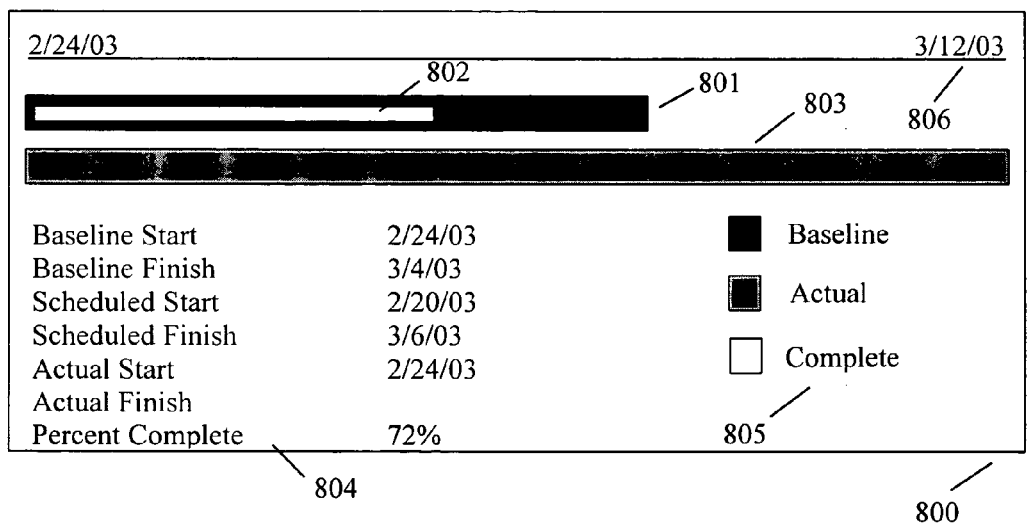
FIG. 8B shows a simplified Gantt chart according to embodiments of the present disclosure.

The project management system, according to embodiments of the present disclosure, may also generate a simplified Gantt charts. FIG. 8B illustrates a simplified Gantt chart 800 according to embodiments of the present disclosure. A simplified Gantt chart 800 may be used to provide a chart for the closer inspection of a particular project item, for example, a task. Simplified Gantt charts 800 may be similar to the Gantt chart described above and illustrated in FIG. 8A but generally only show a single project item. Simplified Gantt charts 800, according to embodiments of the present disclosure, may have a first single bar representing the baseline timeframe for the project item 801, a second single bar representing the actual timeframe 803, and a third single bar representing percent completion of the project item 802. The bar representing percent completion of the project item 802 may be placed on top of one of the other single bars 801, 803, for example, it may be placed on top of the single bar representing the baseline timeframe for the project item 801. The simplified Gantt chart 800 may also include a listing of project fields 804. The listing of project item fields 804 may be limited to fields believed to be of particular importance, such as, for example, baseline start, baseline finish, scheduled start, scheduled finish, actual start, actual finish and/or percent complete but need not be so limited. For example, the listing of project item fields 804 may list all fields for the project item. A legend 805 may also be included. The legend 805 may be used to indicate the description of each single bar 801-803 and/or may position one or more dates along the length of the single bars 801-803 to allow a user viewing the chart to correlate the position of the bars 801-803 with dates.

A drillable Gantt chart, as described above, may be used as a graphical interface for project management systems of the present disclosure. For example, a Gantt chart representing phases of a project may be displayed first. Each Gantt bar may be color coded as described above according to the customizable tolerance settings for that particular user. Particular users may choose to change tolerance settings so they can be made aware of potential problems at an earlier or latter date. For example, one user may wish to be alerted of potential problems before another user. Tolerance level defaults may be assigned in accordance with the type of user. For example, project managers may be alerted of potential problems before executives.

Another example of an effective presentation of data and analysis that can be provided according to embodiments of the present disclosure is the generation of reports. There may be many useful reports that can be generated to provide users with various information and statistics involving projects managed by the systems and/or methods of the present disclosure. One example of such a report is an Effort Expended by Project Report. This report displays all scheduled projects and projects currently in progress and the percentage of overall effort each project represents. This report may be useful to an organization with multiple projects to determine how the time and effort of resources has been distributed between projects.

Another example of a useful report is a Project Stage Status Report. This report can show the stages of each scheduled or in progress project, for example, the phases and tasks of the project. Stages that may be behind schedule can be marked in yellow or red with respect to the tolerances discussed above. The stage names and the number of days behind the stage is (the variance) may be displayed as part of this report. Clicking a stage may take the user to a detailed version of the clicked stage where additional information pertaining to that stage can be displayed. The additional information may include the project name, the stage name, the total hours spent on the stage, the total of hours scheduled for the stage, the total hours remaining to be spent on the stage, the stage's actual start date, the stage's scheduled start date, the stage's baseline start date, the stage's scheduled finish date and/or the variance in days.

Another example of a useful report is a Task Status Report. This report can display two drop down list boxes to allow the report to be customized in several ways. The first drop down box may allow the user viewing the report to select a specific project or choose the "all projects" selection. The second list box may allow the user to select what task status information they would like to see, for example: scheduled tasks, in progress tasks, completed tasks, or behind schedule tasks. The report may then show a list of tasks, based in the status selected, or a particular project or all projects. This report may include the task name, actual start date, scheduled start date, baseline finish date, scheduled finish date and/or variance in days. The report may provide the ability to select a date range that allows the user to narrow or expand the time range for the report.

Another example of a useful report is a Project Resource Assignment report. This report may display a list of resources assigned to a particular project and a list of projects assigned to individual resources. This report may be limited to only display scheduled or in progress projects.

Another example of a useful report is a Submitted Time Report. This report may allow the user to select a period of time and the report can list resources and how much time was spent by each resource in the furtherance of projects during the selected period of time.

Another example of a useful report is a Project Status report. This report may allow the user to select a period of time and the report can show the status of all projects that may be scheduled to start within the time period selected. The report may list, for each project, for example, the project manager name, and for each project assigned to that project manager, the project name, the project status, the scheduled dates and/or the total number of projects in each status.

Another example of a useful report is a Submitted Time by Project report. This report may allow the user to select a project and a period of time and the report can display the names of each resource assigned to the selected project and the amount of time spend by each of them on the selected project.

Figure 10:
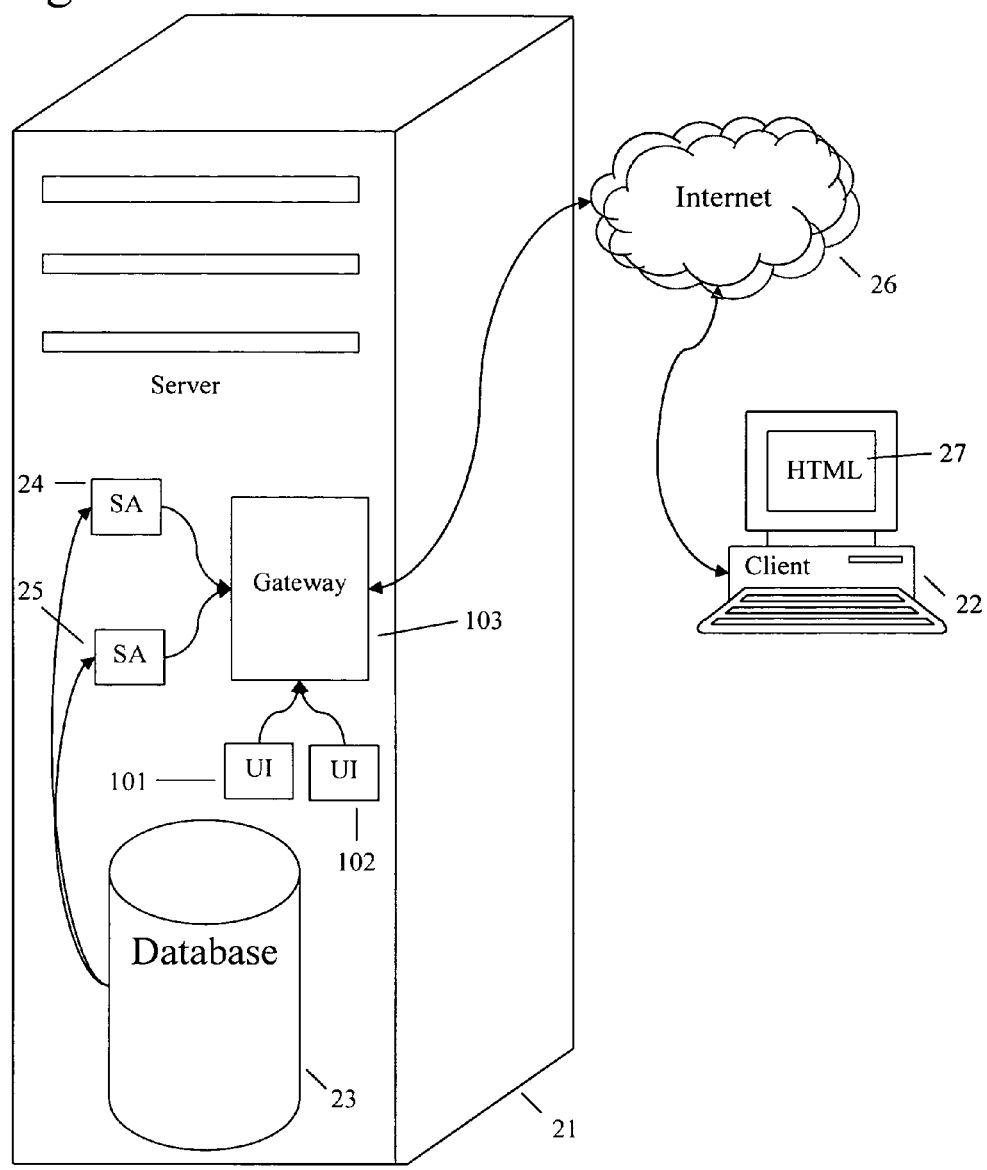
FIG. 10 shows an example of an embodiment of the present disclosure providing for interaction between the server and client.

FIG. 10 illustrates an example of an embodiment of the present disclosure providing for interaction between the server 21 and client 22. According to this embodiment of the present disclosure, one or more clients 22 can simultaneously access server applications 24-25 on the server 21. This access can be achieved, for example, over the Internet 26 and/or another computer network. To facilitate the handling of a variety of clients utilizing a variety of platforms, the server applications can be coded in a cross-platform programming language such as HTML and/or Java. These server applications can be Java applications such as, for example, applets, servlets or portlets. These applications may display information back to the client by producing a WEB page 27, for example, an Internet or an intranet page. The client 22 may then be able to access the produced page 27 through a web browser running on the client 22. Similarly, the server applications 24-25 may receive input from the client 22 by interaction between the produced web pages 27 and the client's browser. These web pages 27 may be augmented using techniques for the production of websites. For example, scripting languages such as JavaScript may be used to enhance the interaction between client 22 and server application 24-25. For such embodiments, the client's browser may have plug-ins installed to facilitate the communication between server and client.

A gateway 103 may be used as a single point of entry for web applications, for example, the project management system according to embodiments of the present disclosure. The gateway 103 may be a server application, for example a Java servlet, executed within the server 21 and may be the server application responsible for managing communications with one or more clients 22 through the Internet 26.

As the point of entry, the gateway 103 may be responsible for receiving and handling all requests from clients 22. Requests, for example, may include the production of a Gantt chart or the retrieval or certain information from the database 23. The clients 22 may submit one or more parameters to the gateway 103 that may be used to identify the nature of the request being sent. The gateway 103 may then hand out received requests for processing to the local server application 24-25 that is suitable for executing the desired request. For example, if a client 22 requests that the status of a project be determined, this request may be received by the gateway along with parameters indicating the nature of the request, which may include, for example, the project ID of the project whose status is to be determined. The gateway 103 may then identify that the appropriate server application to execute this request may be the status server application 61. The gateway 103 may then hand out the request to the status server application 61. The status server application may then calculate the status of the project as described above. Any further interaction between the client 22 and the status server application 61 is handled through the gateway.

The gateway 103 may also facilitate the handling of HTML interactions between client 22 and server 21. The gateway may handle the HTTP session. This may include establishing a connection with the client 22 and forming responsive web pages. The gateway 103 may gather output elements from one or more other server applications 24-25 and use them to form one complete HTML response. In so doing, the gateway 103 may consolidate multiple functionalities, for example, user identification and validation, security and the production of a common user interface regardless of which server application functions a user seeks to utilize. The gateway 103 may also be used to generate common elements of produced web pages 27, for example, the gateway can provide standard header and footer HTML.

The gateway 103 may call upon UI server applications 101-102 which may be designed to provide user interface features to the produced web pages 104. UI server applications 101-102 may also be used to provide additional common elements used in the formation of the responsive web pages.

The handling of interaction between client 22 and server 21 may also be handled through a desktop project application such as, for example, the Microsoft Project Application which can function as a desktop scheduler for managing projects.

The handling of interaction between client 22 and server 21 may be facilitated by the use of a client interface running on the client 22. For example, CleverPath Portal can be used as a client interface to display the portal applications which can be CleverPath Project Monitor portlets.

Server applications for producing graphics and/or charts such as the Gantt charts produced according to embodiments of the present disclosure may generate the graphics and charts as compressed image files such as jpegs that may be easily integrated into web pages. These server applications can draw on current data that may be available in the database and the calculations provided by other server applications as described above.

Figure 11:
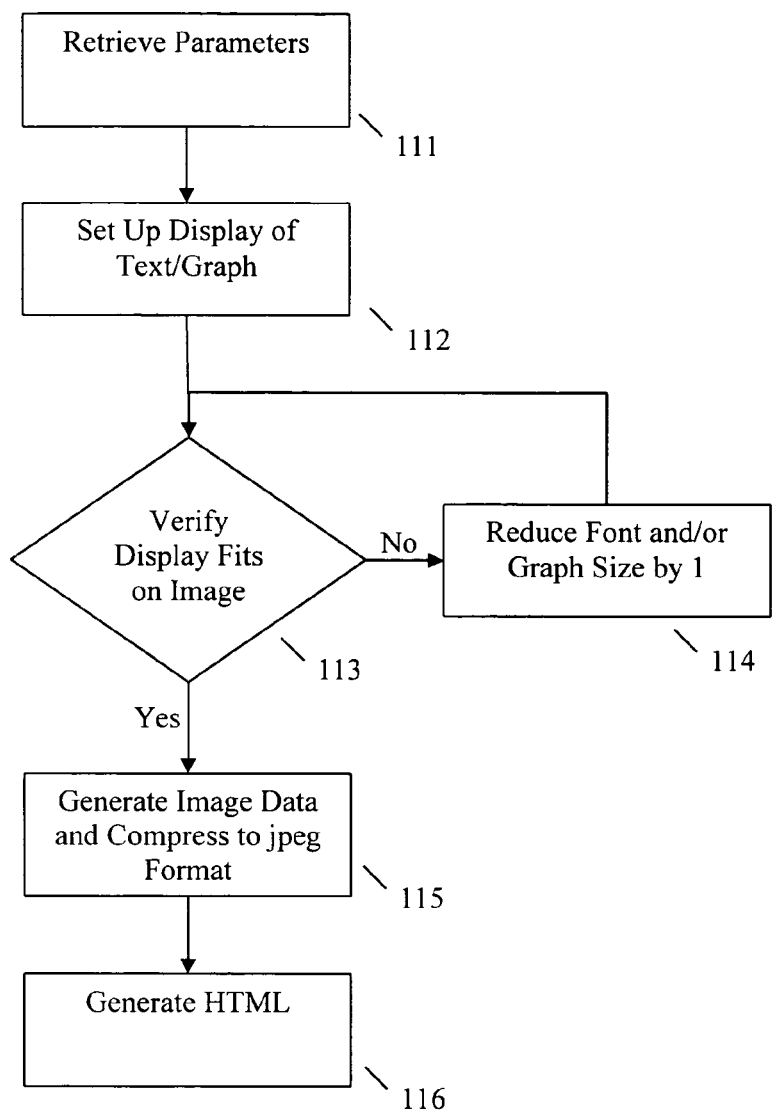
FIG. 11 shows a flow chart for a method of presenting data to a user according to an embodiment of the present invention.

FIG. 11 illustrates a flow chart for a method of presenting data to a user according to an embodiment of the present disclosure. As stated above, the user may interact with a server application on the server 21 though a web browser. In the course of this interaction, the server application may retrieve parameters used for the formation of a text and/or graphical display (Step S111). These parameters may be, for example, data retrieved from a database. These parameters may be, for example, data provided to the server application from the user. The server application may take these parameters and perform server application functionality depending on the function of the server application. For example, where the server application is a program for the management of projects, analysis may be performed on the input data to generate a Gantt chart and/or a report, as described above.

Parameters may also be display parameters relating to the physical characteristics of how data, charts and/or reports are formatted for image generation. For example, parameters may include text size, position and/or color.

Output generated by the server application may be setup to be displayed as text and/or graphics (Step S112). Setting up the output for display may include generating a graph and/or generating the appropriate text to be output. Here, display characteristics, for example, appropriate font and background characteristics may be selected according to the function of the server application. For example, if the server application produces an error message, a pre-selected format may be employed which may include, for example, proper font characteristics, background color, window size and accompanying picture. After the display characteristics have been applied to the data to be displayed, the display may be checked to see if the data to be displayed, as formatted, can be accommodated within the size of the image (Step S113). The size of the image may be defined by a parameter and/or may be pre-defined by the server application. If the data to be displayed, as formatted, is too large to fit within the image, (No Step S113) then the size of the font in which the data is displayed, and/or the size of any graphics to be displayed may be reduced by one increment (Step S114). An increment may be a single font size, for example, reducing a font size from 12 points to 11 points and/or an increment may be an incremental reduction of picture size.

Where necessary, the size may be repeatedly reduced (Step S114) until the size of the display has been appropriately reduced. There may be a lower limit set on how small a font may be reduced before it is too small to display. For example, the font may be limited to no less than 3 points. Where a font has been reduced to the minimum allowable font size, the font will not be reduced further and may, for example, be truncated.

Where it has been verified that the display fits on the image (Yes Step S113), a picture file may be generated from the image data (Step S115). The picture file may be an uncompressed picture format, for example a bitmap (.bmp). Alternatively, the picture file may be compressed and stored in a compressed picture format, for example, as a jpeg. Alternatively, the picture may be compressed in a format, for example, a jpeg format, and sent directly to the requesting client without being stored in a file system. This picture and/or picture file may include text and/or graphics but may ultimately be stored as a single graphical image. The graphical image may then be included into a web page and published within the server 21 where it may be accessed by the client 22 via a web browser.

As stated above, a server application may retrieve parameters used for the formation of a text and/or graphical display (Step S111). Where the server application may be used to display text and/or graphics relating to the management of projects, examples of these parameters may include:
   projID—the ID of the project being displayed,
   imgHeight—the height of the bar chart to be requested, the default may be 15 pts.,
   imgWidth—the width of the chart to be requested, the default may be 625 pts.,
   imgBGColor—the background color of the image, the default may be white,
   locale—the Java locale code that may be used to properly format data, such as, for example, dates, according to the standards of the locale in which the user may be situated,
   dayRangeWarn—the number of days a date may be late before it foes into warning severity (warning tolerance),
   dayRangeCrit—the number of days a date may be late before it goes into critical status (critical tolerance), and
   navHdrTyp—the navigation header types to use, this may be, for example, a title for the image.

Other parameters may be used to set common formatting for the production of images. These parameters may be stored in an external file. Examples of these parameters may include:
   lineColor—the color of Gantt bars,
   lineFreq—the approximate spacing between Gantt bars, and
   dateFreq—the approximate spacing between date labels on a Gantt chart.

This embodiment allows for dynamic image generation with text messages. For example, the present system may be capable of dynamically generating jpeg images that contain text messages. Such dynamic image generation may be used, for example, for creating images to display error messages to a user when another dynamic image (e.g., a Gantt bar) encounters an error and cannot be generated. The system may allow for specifying the font face, font color, background color and image size for the resulting image.

The embodiment relating to the generation of text message images may be comprised of two main elements. The first element may be building the image based on submitted parameters. These parameters may, for example, include:
   sText—the text to be displayed in the image,
   iImageWidth—the width of the resulting image,
   iImageHeight—the height of the resulting image,
   iBGColor—the background color of the resulting image,
   iTextColor—the color of the text,
   iFontSize—the point size of the font to be used, and
   sFontFace—the name of the font to be used.

Internal default values may be used for any parameters not submitted. For example, the default sText may be an empty string.

The second element may be to integrate the generated image into a web page that is accessible using a browser over the Internet as described above.

There may be many different ways of implementing dynamic image generation. For example, preexisting 'stock' images may be used to produce a composite image. In addition, enhancing may be used to parse HTML, XML, etc. and produce a wider variety of formatting in the images.

As described above, project management systems according to embodiments of the present disclosure may also be capable of handling multiple users such as, for example, administration managers, resource managers, project managers and executives. Individuals whose efforts contribute to the furtherance of projects but may not be among the above listed users may be classified as team members. Team members are commonly those individuals who may be directly responsible for the completion of tasks. As such, team members may be assigned to tasks as resources. Team members may also be responsible for supplying the database with actual dates, such as, for example, the actual start data and actual completion date of tasks. Team members may use the management system to keep track of tasks assigned to that team member. For example, team members may maintain a to do list as described above. Administration managers have responsibilities for the administration of the project management system. For example, administration managers may determine the project schedule. Administrative managers may also run various reports and generate various graphs of interest to the administration of the project. Resource managers have responsibilities relating to the assignment of resources. For example, resource managers may determine which resources are available to which projects. Resource managers may also run various reports and generate various graphs relating to the allocation of resources among projects. Project managers may have primary responsibility over one or more particular projects. A project manager may be the user who creates the project record, project phase records and project task records and supplies information pertaining to the record fields. Project managers may also wish to view reports and generate graphs pertaining to the various projects within the project manager's scope of responsibility. Executives may be users who have an interest in examining various reports and graphs relating to one or more projects.

Figure 12:
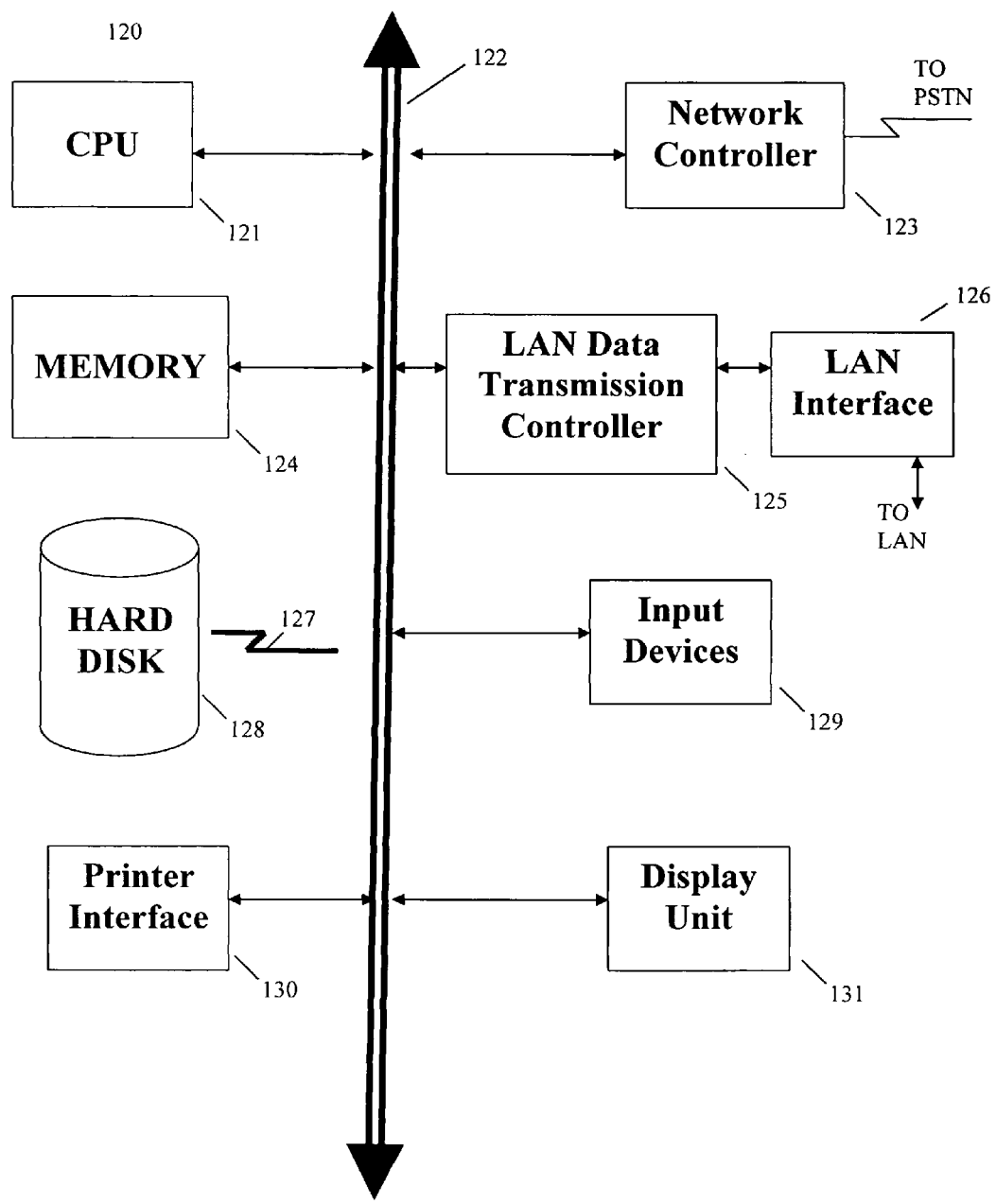
FIG. 12 shows an example of a computer system capable of implementing the method and apparatus according to embodiments of the present disclosure.

FIG. 12 shows an example of a computer system which may implement the method and system of the present disclosure. The system and method of the present disclosure may be implemented in the form of a systems application running on a computer system, for example, a mainframe, personal computer (PC), handheld computer, server, etc. The systems application may be stored on a recording media locally accessible by the computer system and accessible via a hard wired or wireless connection to a network, for example, a local area network, or the Internet.

The computer system referred to generally as system 100 may include, for example, a central processing unit (CPU) 102, random access memory (RAM) 104, a printer interface 106, a display unit 108, a local area network (LAN) data transmission controller 110, a LAN interface 112, a network controller 114, an internal buss 116, and one or more input devices 118, for example, a keyboard, mouse etc. As shown, the system 100 may be connected to a data storage device, for example, a hard disk, 120 via a link 122.

The above specific embodiments are illustrative, and many variations can be introduced to these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method, comprising:
providing at least one parameter;
generating a display using said at least one parameter;
determining whether said display fits within an image;
resizing said display to fit within said image when said display does not fit within said image, wherein said resizing said display to fit within said image when said display does not fit within said image comprises truncating said display when resizing said display would cause said display to violate a display size limit;
generating a picture file that includes said image and said resized display, said picture file complying with a standard picture file format; and
making said picture file available over a network.

2. The method of claim 1, wherein said display comprises a Gantt chart.

3. The method of claim 1, wherein said display comprises an error message.

4. The method of claim 1, wherein said display comprises a report.

5. The method of claim 1, wherein said display comprises text.

6. The method of claim 1, wherein said display comprises one or more graphics.

7. The method of claim 1, wherein said display comprises a composite of text and graphics.

8. The method of claim 1, additionally comprising incorporating said picture file into a web page.

9. The method of claim 1, wherein said at least one parameter comprises data.

10. The method of claim 1, wherein said at least one parameter comprises project management data.

11. The method of claim 10, wherein colors used in generating said display are selected with respect to a status of said project management data.

12. The method of claim 1, further comprising compressing said picture file to comply with a standard compressed picture file format.

13. The method of claim 12, wherein said standard compressed picture file format is jpeg.

14. The method of claim 1, wherein said network is the Internet.

15. A system, comprising:
a computer-readable medium; and
a processor operable to execute a program of instructions encoded on the computer-readable medium, the program of instructions comprising:
a providing unit for providing at least one parameter;
a generating unit for generating a display using said at least one parameter;
a determining unit for determining whether said display fits within an image and further for resizing said display to fit within said image when said display does not fit within said image, wherein said resizing said display to fit within said image when said display does not fit within said image comprises truncating said display when resizing said display would cause said display to violate a display size limit;
a picture file generating unit for generating a picture file that includes said image and said resized display, said picture file complying with a standard picture file format; and
a making unit for making said picture file available over a network.

16. The system of claim 15, wherein said display comprises a Gantt chart.

17. The system of claim 15, wherein said display comprises an error message.

18. The system of claim 15, wherein said display comprises a report.

19. The system of claim 15, wherein said display comprises text.

20. The system of claim 15, wherein said display comprises one or more graphics.

21. The system of claim 15, wherein said display comprises a composite of text and graphics.

22. The system of claim 15, wherein said program of instructions further comprises an incorporating unit for incorporating said picture file into a web page.

23. The system of claim 15, wherein said at least one parameter comprises data.

24. The system of claim 15, wherein said at least one parameter comprises project management data.

25. The system of claim 24, wherein colors used in generating said display are selected with respect to a status of said project management data.

26. The system of claim 15, wherein said program of instructions further comprises a compressing unit for compressing said picture file to comply with a standard compressed picture file format.

27. The system of claim 26, wherein said standard compressed picture file format is jpeg.

28. The system of claim 15, wherein said network is the Internet.

29. A computer system comprising:
a processor; and
a program storage device including computer executable code, comprising:
code for providing at least one parameter;

code for generating a display using said at least one parameter;

code for determining whether said display fits within an image;

code for resizing said display to fit within said image when said display does not fit within said image, wherein said resizing said display to fit within said image when said display does not fit within said image comprises truncating said display when resizing said display would cause said display to violate a display size limit;

code for generating a picture file that includes said image and said resized display, said picture file complying with a standard picture file format; and code for making said picture file available over a network.

30. The computer system of claim 29, wherein said display comprises a Gantt chart.

31. The computer system of claim 29, wherein said display comprises an error message.

32. The computer system of claim 29, wherein said display comprises a report.

33. The computer system of claim 29, wherein said display comprises text.

34. The computer system of claim 29, wherein said display comprises one or more graphics.

35. The computer system of claim 29, wherein said display comprises a composite of text and graphics.

36. The computer system of claim 29, wherein said program storage device further comprises code for incorporating said picture file into a web page.

37. The computer system of claim 29, wherein said at least one parameter comprises data.

38. The computer system of claim 29, wherein said at least one parameter comprises project management data.

39. The computer system of claim 38, wherein colors used in generating said display are selected with respect to a status of said project management data.

40. The computer system of claim 29, wherein said program storage device further comprises code for compressing said picture file to comply with a standard compressed picture file format.

41. The computer system of claim 40, wherein said standard compressed picture file format is jpeg.

42. The computer system of claim 29, wherein said network is the Internet.

43. A computer program product comprising:
a non-transitory computer-readable storage medium having computer-readable program code embodied therewith, the computer-readable program code comprising:

code for generating a display using said at least one parameter;

code for determining whether said display fits within an image;

code for resizing said display to fit within said image when said display does not fit within said image, wherein said resizing said display to fit within said image when said display does not fit within said image comprises truncating said display when resizing said display would cause said display to violate a display size limit;

code for generating a picture file that includes said image and said resized display, said picture file complying with a standard picture file format; and code for making said picture file available over a network.

44. The computer program product of claim 43, wherein said display comprises a Gantt chart.

45. The computer program product of claim 43, wherein said display comprises an error message.

46. The computer program product of claim 43, wherein said display comprises a report.

47. The computer program product of claim 43, wherein said display comprises text.

48. The computer program product of claim 43, wherein said display comprises one or more graphics.

49. The computer program product of claim 43, wherein said display comprises a composite of text and graphics.

50. The computer program product of claim 43, further comprising code for incorporating said picture file into a web page.

51. The computer program product of claim 43, wherein said at least one parameter comprises data.

52. The computer program product of claim 43, wherein said at least one parameter comprises project management data.

53. The computer program product of claim 52, wherein colors used in generating said display are selected with respect to a status of said project management data.

54. The computer program product of claim 43, further comprising code for compressing said picture file to comply with a standard compressed picture file format.

55. The computer program product of claim 54, wherein said standard compressed picture file format is jpeg.

56. The computer program product of claim 43, wherein said network is the Internet.

* * * * *